US010158724B2

(12) United States Patent
Fromentoux et al.

(10) Patent No.: US 10,158,724 B2
(45) Date of Patent: Dec. 18, 2018

(54) MANAGEMENT OF NOTIFICATIONS IN A MOBILE WEB APPLICATION

(71) Applicant: Orange, Paris (FR)

(72) Inventors: Gael Fromentoux, Pleumeur Bodou (FR); Arnaud Braud, Lannion (FR); Emile Stephan, Pleumeur Bodou (FR)

(73) Assignee: ORANGE, Paris (FR)

( * ) Notice: Subject to any disclaimer, the term of this patent is extended or adjusted under 35 U.S.C. 154(b) by 29 days.

(21) Appl. No.: 14/649,870

(22) PCT Filed: Dec. 3, 2013

(86) PCT No.: PCT/FR2013/052927
§ 371 (c)(1),
(2) Date: Jun. 4, 2015

(87) PCT Pub. No.: WO2014/087094
PCT Pub. Date: Jun. 12, 2014

(65) Prior Publication Data
US 2015/0312355 A1    Oct. 29, 2015

(30) Foreign Application Priority Data

Dec. 4, 2012  (FR) ...................................... 12 61582

(51) Int. Cl.
*G06F 15/16*  (2006.01)
*H04L 29/08*  (2006.01)
*H04W 4/14*  (2009.01)

(52) U.S. Cl.
CPC .............. *H04L 67/16* (2013.01); *H04L 67/02* (2013.01); *H04L 67/10* (2013.01); *H04W 4/14* (2013.01)

(58) Field of Classification Search
CPC .............. H04L 29/08072; H04L 29/06; H04L 29/0809
(Continued)

(56) References Cited

U.S. PATENT DOCUMENTS 6,947,396 B1 * 9/2005 Salmi .................. H04L 12/1859
370/310
2009/0260004 A1 * 10/2009 Datta ........................ G06F 8/65
717/175
(Continued)

OTHER PUBLICATIONS

"Push API." Push API. Ed. Michaël Van Ouwerkerk, Martin Thomson, Bryan Sullivan, and Eduardo Fullea. W3C, Sep. 24, 2015. Web. <http://dvcs.w3.org/hg/push/raw-file/default/index.html>.
(Continued)

*Primary Examiner* — Alan S Chou
(74) *Attorney, Agent, or Firm* — David D. Brush; Westman, Champlin & Koehler, P.A.

(57) ABSTRACT

A method is provided for managing notifications between a user agent installed in a mobile terminal and a web server. The method includes the following acts, carried out by an intermediate piece of equipment: receiving a notification message from the mobile terminal in accordance with a first protocol designed for transmission over a signaling channel, the notification message including notification data from the user agent; generating a notification message in accordance with a second protocol designed for transmission over the Internet network, in which the notification data is inserted; and transmitting to the web server, of the notification message in accordance with the second protocol. Also provided are an intermediate piece of equipment implementing these acts, as well as a method for sending a notification message and a mobile terminal implementing such a sending method.

9 Claims, 4 Drawing Sheets

(58) Field of Classification Search
USPC .......................................................... 709/203
See application file for complete search history.

(56) References Cited

U.S. PATENT DOCUMENTS

2010/0319062 A1    12/2010   Danieli et al.
2012/0042004 A1     2/2012   Shenfield
2012/0124151 A1*    5/2012   Au ......................... G06F 9/542
                                                        709/206

OTHER PUBLICATIONS

English translation of the Written Opinion dated Jun. 4, 2015 for corresponding International Patent Application No. PCT/FR2013/052927, filed Dec. 3, 2013.
International Search Report and Written Opinion dated Feb. 10, 2014 for corresponding International Application No. PCT/FR2013/052927, field Dec. 3, 2013.
Anonymous: "Push API", W3C, XP002699417, internet: URL: https://dvcs.w3.org/hg/push/raw-file/default/index.html, Jun. 25, 2013.

* cited by examiner

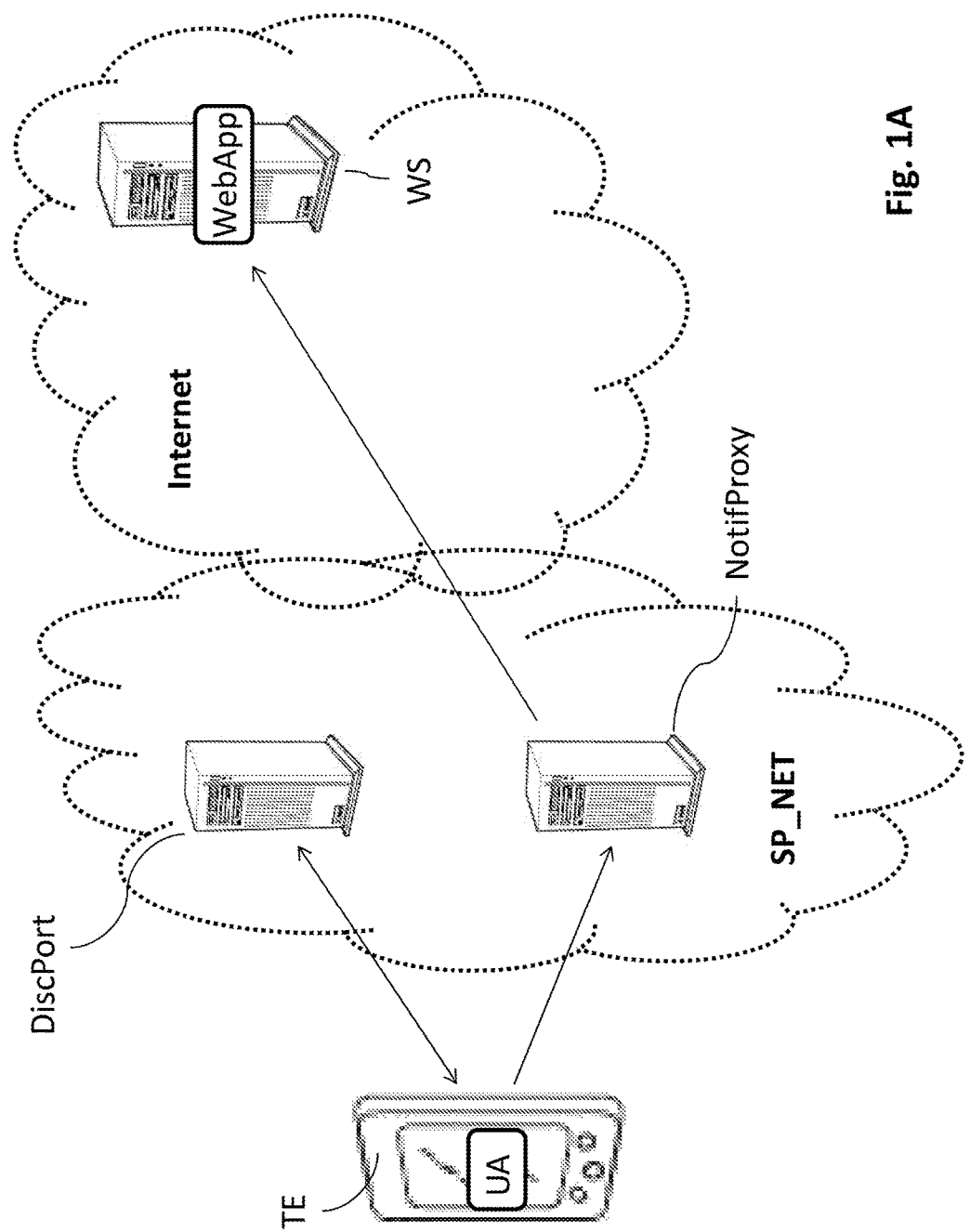

MANAGEMENT OF NOTIFICATIONS IN A MOBILE WEB APPLICATION

CROSS-REFERENCE TO RELATED APPLICATIONS

This application is a Section 371 National Stage Application of International Application No. PCT/FR2013/052927, filed Dec. 3, 2013, the content of which is incorporated herein by reference in its entirety, and published as WO 2014/087094 on Jun. 12, 2014, not in English.

FIELD OF THE DISCLOSURE

The present invention relates to the field of the management of notifications between a mobile terminal and a web server on which is installed an application called "mobile web application".

BACKGROUND OF THE DISCLOSURE

The applications on mobiles have undergone a significant expansion in recent years, which has contributed to the explosion of the quantity of data exchanged between the mobile terminals and the mobile communication networks, as well as the quantity of signaling messages exchanged over these networks.

The new generation of applications on mobiles, called "mobile web applications", relies on the use of a user agent installed on a mobile terminal (typically a web browser) used to control a web application installed on a remote web server, via a mobile telecommunications access network and the Internet network.

This new generation of mobile web applications, through its decentralized and interactive nature, risks further increasing the phenomenon of growth of the quantity of data and of signaling messages exchanged over the network. In particular, the management of the notifications by these mobile web applications, imported from the practices of the conventional "web" applications in the fixed networks, is not suited to a mobile environment.

Thus, the use of http requests for the notification, for example for so-called "http polling" or "textstreams" techniques, between the mobile terminal and the web server is not optimal, because these http requests generally generate a large number of "keep-alive" http messages in order to check whether the radio link is still set up with the network, which requires a data radio link, in the form of a dedicated transport channel DCH, which has to be re-established each time a notification is sent, and therefore generate the consumption of a large quantity of radio resources.

Furthermore, so-called "fast dormancy" functions have been implemented in certain mobile telephones in order to save on the batteries of the mobile telephones. With this type of function, the establishment of a data radio link channel becomes lengthy and costly, both in terms of battery energy consumption and of signaling on the network, which is not compatible with the multiplication of the notification messages brought about by the expansion of the mobile web applications.

A technical implementation of "Push API" type, consisting in introducing a "push" proxy server into the network, has been proposed in the downlink direction, that is to say from the web server to the mobile terminals. See http://dvcs.w3.org/hg/push/raw-file/default/index.html In this technical implementation, a "push" proxy server is introduced into the network of the operator, between the mobile terminal and the web server. The web server can send to this "push" proxy server a "push" message intended for the web application installed on the mobile terminal TE, this "push" message being defined according to a particular service programming interface (API). The "push" proxy server will then convert this "push" message into a new "push" message according to a particular service protocol, and transmit this new "push" message to the mobile terminal TE where it will be analyzed.

Such a solution is however limited to just the downlink direction and does not address the issue of the increase in the signaling in the uplink direction, from the mobile terminal on which the user agent is installed to the web server.

SUMMARY

One of the aims of the present invention is to improve the present situation by remedying the above-mentioned drawbacks of the prior art.

Thus, there is proposed a method for managing notifications between a user agent installed in a mobile terminal and a web server, comprising the following steps, performed by an intermediate equipment item:

reception, from the mobile terminal, of a notification message conforming to a first protocol suited to transmission in a signaling channel, said notification message comprising notification data emanating from the user agent;

generation of a notification message conforming to a second protocol suited to transmission in the Internet network, into which the notification data are inserted; and transmission, to the web server, of the notification message according to the second protocol.

This method makes it possible to minimize the quantity of signaling generated between the user agent and the web server, by avoiding the establishment or the re-establishment of a dedicated transport channel for each notification sent from the user agent to the server application. Furthermore, the use of a signaling channel for the notification messages to a web application transmitted by the mobile terminal makes it possible for these notifications to be sent when the mobile telephone is on standby, without having to reawaken it as is the case when a dedicated transport channel has to be established to transmit a notification. These operations are, furthermore, performed transparently for the web server, which enables the developers of web applications to use the notification functions independently of the access network and of the chosen transmission method.

According to an advantageous embodiment, the generation of the notification message conforming to the second protocol comprises the insertion, into the notification message conforming to the second protocol, of at least one parameter of access to an application installed in the web server, this access parameter being recovered from at least one compact access parameter inserted by the mobile terminal into the notification message according to the first protocol, and the size of the compact access parameter being less than the size of the parameter of access to the application.

This makes it possible to reduce the size of the notification messages transmitted by the mobile terminal in the uplink direction, and therefore the resources allocated to these notifications by the access network used by the mobile terminal, and makes it possible to render the management principle according to the present invention compatible with existing protocols for creating messages of reduced size.

Advantageously, the method further comprises the following steps:

reception, from the mobile terminal, of a message comprising the at least one parameter of access to the service provided by the web server;

generation, from the at least one parameter of access to the service supplied by the web server, of the at least one compact access parameter; and transmission, to the mobile terminal, of a message comprising the compact access parameter.

The management of the conversion of the parameters of access to the web application is then performed in a centralized manner, on the equipment responsible for converting the notification messages intended for the server application. The mobile terminals thus do not need to be modified substantially to be able to use the method of the present invention.

There is also proposed a method for sending notifications from a user agent installed in a mobile terminal to a web server, comprising the following steps, performed by the mobile terminal:

generation of a notification message conforming to a first protocol suited to transmission in a signaling channel, into which are inserted notification data emanating from the user agent;

transmission of the notification message to an intermediate equipment item suitable for generating a notification message conforming to a second protocol, suited to transmission over the Internet network, into which the notification data are inserted, and for transmitting to the web server said notification message according to the second protocol.

According to an advantageous embodiment, the generation of the notification message conforming to the first protocol comprises the insertion, into the notification message conforming to the first protocol, of at least one compact access parameter corresponding to at least one parameter of access to an application installed in the web server, the size of the compact access parameter being less than the size of the parameter of access to the server application. Advantageously the sending method further comprises the transmission, to the intermediate equipment item, of a message comprising this at least one parameter of access to the application installed in the web server and the reception, from the intermediate equipment item, of a message comprising this at least one compact access parameter.

In a particular embodiment, the above method comprises a phase of discovery during which the mobile terminal recovers the address of the intermediate equipment item from a discovery portal, this address being used by the mobile terminal in the transmission of the notification message and/or of the message comprising the parameter of access to the application. This enables the network of the operator to best switch the mobile terminal to the equipment item responsible for the management of the notifications in the uplink direction.

According to a particular embodiment, the notification message conforming to the first protocol is a message of SMS type. This makes it possible to apply the notification management method according to the present invention to mobile terminals in a quasi-transparent manner and without having to substantially modify their mode of operation, by reusing a widely used protocol for creating short messages.

According to another particular embodiment, the notification message conforming to the second protocol is an http request. This makes it possible to apply the notification management method according to the present invention to application servers in a transparent manner, without any modification, by reusing the http protocol that they normally use to exchange notifications with the mobile terminals.

There is further proposed an intermediate equipment item for managing the notifications between a user agent installed on a mobile terminal and a web server, comprising:

a transceiver module suitable for receiving, from the mobile terminal, a notification message conforming to a first protocol suited to transmission in a signaling channel, comprising notification data emanating from the user agent; and a data processing module configured to generate a notification message conforming to a second protocol suited to transmission in the Internet network, into which the notification data are inserted;

the transceiver module being configured to transmit the notification message according to the second protocol to the web server.

In this intermediate equipment item, the data processing module can advantageously be further configured to recover at least one parameter of access to an application installed in the web server, from at least one compact access parameter inserted into the notification message conforming to the first protocol, the size of the compact access parameter being less than the size of the parameter of access to the application, and insert the parameter of access to the application into the notification message conforming to the second protocol.

Moreover, the data processing module can advantageously be further configured to generate the compact access parameter from the parameter of access to the application received from the mobile terminal, the transceiver module being configured to transmit to the mobile terminal the compact access parameter generated by the data processing module.

According to a particular embodiment, in this intermediate equipment item:

the transceiver module is suitable for receiving, from the web server, a second notification message conforming to the second protocol suited to transmission in the Internet network, comprising notification data emanating from the web server;

the data processing module is configured to generate a second notification message conforming to a protocol suited to transmission in a signaling channel, into which the notification data are inserted;

the transceiver module is further configured to transmit the second notification message conforming to a protocol suited to transmission in a signaling channel to the mobile terminal.

Such an intermediate equipment item is thus capable of managing the sending of notifications between a web application and a mobile terminal in both directions.

In particular, the signaling channel used to receive the first notification message from the mobile terminal is advantageously different from the signaling channel used to transmit the second notification message to the mobile terminal, in order to limit the risks of saturation of a signaling channel in the case of huge numbers of notifications being sent.

There is also proposed a mobile terminal comprising a transceiver module and a data processing module in which is installed a user agent exchanging data with a web server, in which the data processing module is configured to generate a notification message conforming to a first protocol suited to transmission in a signaling channel, this notification message comprising notification data emanating from the user agent, and the transceiver module is configured to transmit the notification message to an intermediate equipment item, suitable for generating a notification message conforming to a second protocol suited to transmission over the Internet network, into which the notification data are inserted, and for transmitting to the web server said notification message conforming to the second protocol.

In such a mobile terminal, the transceiver module can, furthermore, be suitable for sending to the intermediate equipment item at least one parameter of access to the server application and for receiving, in return, at least one compact access parameter, the data processing module being further configured to insert the compact access parameter into the notification message conforming to the first protocol.

According to a particular implementation, the different steps of the above method are implemented by software or a computer program, this software comprising software instructions intended to be executed by a data processing module (e.g. a processor) and being designed to control the execution of the different steps of this method. Consequently, the invention also targets a program that can be run by a computer or by a data processor, this program comprising instructions to control the execution of the steps of a method as mentioned above. This program can use any programming language, and be in the form of source code, object code, or intermediate code between source code and object code, such as in a partially compiled form, or in any other desirable form.

The invention also targets an information medium, readable by a computer or data processor, and comprising instructions of a program as mentioned above. This information medium can be any entity or device capable of storing the program. For example, the medium can comprise a storage means, such as a ROM, for example a CD-ROM or a microelectronic circuit ROM, or even a magnetic recording means, for example a diskette or a hard disk. Also, the information medium can be a transmissible medium such as an electrical or optical signal, which can be routed via an electrical or optical cable, by radio or by other means. The program according to the invention can in particular be downloaded over a network of Internet type. Alternatively, the information medium can be an integrated circuit in which the program is incorporated, the circuit being adapted to execute or to be used in the execution of the method concerned.

BRIEF DESCRIPTION OF THE DRAWINGS

Other features and advantages of the invention will become apparent on reading the following detailed description of particular embodiments, given as nonlimiting examples, and the attached figures in which:

FIG. 1A schematically represents a telecommunications system in which a first embodiment of the notification management method according to the present invention can be implemented;

DETAILED DESCRIPTION OF ILLUSTRATIVE EMBODIMENTS

Figure 1B:
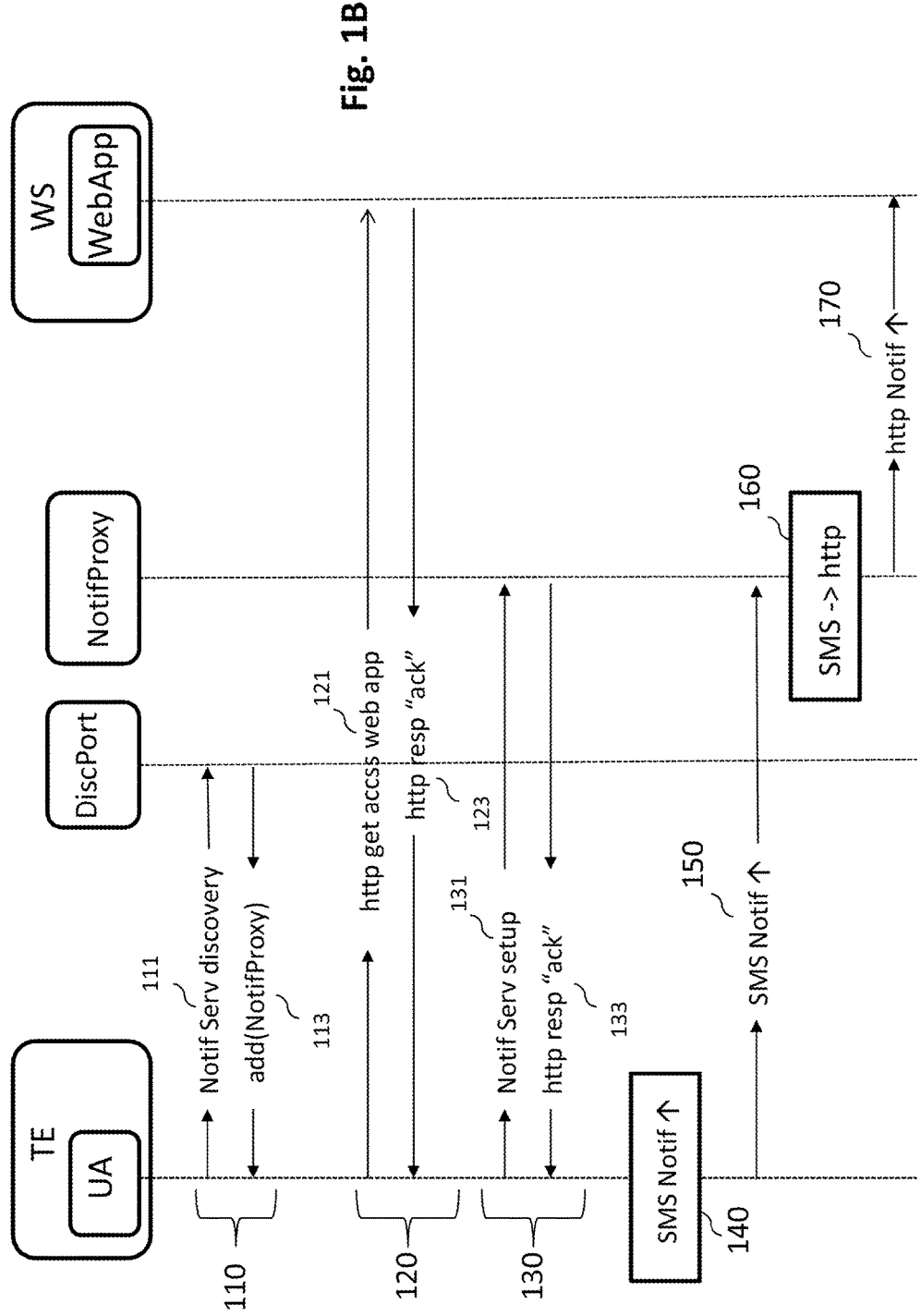
FIG. 1B illustrates the steps of a notification management method according to a first embodiment of the invention.

Reference is made first to FIG. 1A, in which a telecommunications system is represented in which a first embodiment of the notification management method according to the present invention can be implemented.

This system comprises, on the one hand, a mobile terminal TE, typically (but not exclusively) of Smartphone type, comprising, on the one hand, a transceiver module, notably having a radio antenna to exchange messages with a mobile telephony network, and a data processing module (typically a processor associated with a RAM memory and a ROM memory), in which is installed a user agent UA that can be a web browser.

The user agent UA installed on this mobile terminal TE exchanges data with a web application (designated WebApp) installed on a remote web server (designated WS). Such a web server is configured to receive and transmit requests conforming to a protocol suited to transmission of data over the Internet network (for example the http protocol), which are interpreted by the WebApp application, in order to provide a service to the user of the mobile terminal TE. By way of example, the service supplied by such a web application can be the sending of a web page, typically in an HTML format, to the user agent UA.

When the user agent UA wants to transmit a notification to the WebApp application, for example following the occurrence of a particular event detected by the mobile terminal TE (measurement of the position or of the state of availability of the mobile terminal), the mobile terminal TE sends, by radio channel, notification data, emanating from the user agent, to the telecommunications network of a telephony operator (SP_NET) to which it has access, via a mobile access network (not represented) with which the mobile terminal TE can exchange, on the one hand, signaling data by means of a signaling channel and, on the other hand, useful content data by means of a transport channel.

The network SP_NET receives these notification data and relays them, via the Internet network, to the web server WS, in order for these notification data to be able to be interpreted by the WebApp application. To this end, the telecommunications network SP_NET comprises an intermediate equipment item, here designated "NotifProxy", responsible for relaying the notification messages in the uplink direction, i.e. transmitted by the user agent UA to the web server WS, according to the notification management method described hereinbelow.

This intermediate equipment item can notably be implemented in the form of a proxy server and notably comprises a transceiver module, equally suitable for receiving the messages transmitted by the mobile terminal and for transmitting to the Internet network messages intended for the web server WS, as well as a data processing module (e.g. a processor associated with a random access memory and a read-only memory) capable of processing the notification messages received from the mobile terminal to convert them into notification messages intended for the web server WS and suited to transmission over the Internet network.

Furthermore, the mobile telecommunications network SP_NET can advantageously comprise a discovery portal, designated "DiscPort", enabling the mobile terminal TE to discover the intermediate equipment item NotifProxy, and notably its address (typically its IP address), on request from the mobile terminal TE, in order for the latter to be able to exchange data with this intermediate equipment item.

Reference is now made to FIG. 1B which illustrates a notification management method according to a first embodiment of the present invention.

This method can start with an initial phase (step 110) of discovery, during which the intermediate equipment item NotifProxy is discovered by the mobile terminal TE, in other words during which the mobile terminal recovers the address add(NotifProxy) from the intermediate equipment item NotifProxy, which is particularly appropriate when this mobile terminal TE does not previously know the address of this equipment item.

This discovery phase is implemented by means of the discovery portal DiscPort. The mobile terminal TE sends a notification server discovery request (step 111) to this discovery portal DiscPort, which checks whether there is indeed an intermediate equipment item designated to manage the notifications between the user agent UA and the WebApp application and, if such is indeed the case, returns to the mobile terminal TE (step 113), in a response message, the address add(NotifProxy) of the intermediate equipment item NotifProxy concerned.

In order to proceed with such a check, the discovery request can comprise an identifier of the WebApp application installed on the web server WS, that the discovery portal DiscPort uses to search for any associated intermediate equipment item in an association table stored in the discovery portal, in which are recorded the addresses of the intermediate equipment item or items responsible for this function for one or more web applications installed on a remote web server.

Then, the user agent UA of the mobile terminal can proceed to install the web application (step 120), by sending a request (typically of http type) to the web server, in order to obtain in return application data notably comprising data corresponding to a web page, for example in the html format, that can be displayed by the user agent on the screen of the mobile terminal TE. These application data can also comprise a script, for example according to the JavaScript language, that is used to trigger the subsequent steps of the method.

The service for managing notifications by the intermediate equipment item NotifProxy can then be activated (step 130), for example on instruction of the script downloaded from the web server, by means of the sending, by the mobile terminal TE, of an activation request message (step 131) to the intermediate equipment item NotifProxy, in order for the latter to launch the activation of this service. The intermediate equipment item then returns (step 133) an activation acknowledgement message to the mobile terminal TE, in order to notify the user agent UA that it can begin to send notifications to it in the uplink direction.

Thus, when the user agent UA wants to send a notification to the WebApp application, rather than send, directly to the web server WS, a notification message in the form of a request according to the http protocol, which would entail systematically establishing a dedicated transmission channel, the mobile terminal TE creates (step 140) a notification message containing:
 notification data, emanating from the user agent UA and intended for the WebApp application, which correspond to the event to be notified to this application;
 a destination address corresponding to the address of the intermediate equipment item add(NotifProxy).

This notification message is created in accordance with a first protocol suited to transmission over a signaling channel, in order to avoid having to establish a dedicated transport channel, of DCH channel type, as is the case for a notification http request to be sent back up to the web server.

"Signaling channel" should be understood here to mean a radio transmission channel in which signaling data are transmitted from a mobile terminal to the mobile access network, and vice versa, within the coverage of which the mobile terminal is located. Such a signaling channel is typically active permanently or quasi-permanently, unlike a dedicated transport channel, in as much as signaling data are frequently exchanged with the network.

Such a signaling channel can, furthermore, be considered as a shared channel, in as much as several terminals can use the same signaling channel in one and the same cell of the mobile access network, even several applications. Furthermore, service data (for example SMSs) as well as mobile signaling or notifications can pass therein.

The notification message can thus be implemented in the form of a message of SMS (Short Message Service) type, in accordance with the SMS protocol as defined in the GSM standard. This SMS protocol is in fact suited to transmission over shared signaling channels and thus does not use any dedicated transmission channel of DCH type.

In particular, the notification messages in the SMS format can be transmitted in an SACCH (Slow Associated Control Channel) signaling channel, which is a permanent signaling channel allowing signaling data to be sent back up from the mobile telephones to the network (for example measurement reports concerning the received power level of the signals transmitted by the base station of the cell where the mobile telephones are located). Alternatively, the notification messages in the SMS format can be transmitted in an SDCCH (Stand-alone Dedicated Control Channel) signaling channel.

The duly created notification message is then transmitted (step 150) in the signaling channel, in the mobile access network, to the telecommunications network SP_NET, where it is transmitted to the intermediate equipment item NotifProxy by means of the address add(NotifProxy).

After reception of this notification message, the intermediate equipment item NotifProxy generates (step 160) a new notification message conforming to a second protocol which, for its part, is suited to transmission in the Internet network, into which the intermediate equipment item NotifProxy inserts the notification data extracted from the notification message received. In particular, this new notification message can be implemented in the form of an http request addressed to the web server WS, containing the notification data emanating from the user agent UA.

Once this new notification message is generated, the intermediate equipment item NotifProxy sends this new message (step 170) to the web server WS via the Internet network. When the web server WS receives this notification message, the notification data can be supplied to the WebApp application and interpreted by this application, which can optionally return an http request with response or update data, intended for the user agent UA, to the mobile terminal.

When the first protocol used dictates a limited message size it is possible that this size will be insufficient to transmit the notification data with the parameter(s) of access to the WebApp application. Such is the case in particular for messages of SMS type that have a maximum size of 140 bytes (with 8-bit encoding). In order to overcome this drawback, certain parameters transmitted in the notification message according to the first protocol may be compact in order to be able to be contained in this type of message.

Thus, the following conventional URL address is considered, which would be used in a conventional http notification request transmitted by the user agent UA directly to the web server WS:
http://BaseURL?P0=V0&...P1=V1&...&Pi=Vi&Pi+1=Vi+1&...&Pn=Vn with the following parameters of access to the WebApp application:
  BaseURL is the URL address giving access to the service supplied by the WebApp application. This parameter does not change during the use of this service;
  P0 is a fixed parameter of uniqueness of the service concerned, and V0 is the value associated with this parameter, which form, with BaseURL, a unique combination defining this service (there can be several fixed uniqueness parameters Pj);
  P1, ... , Pi are a first set of quasi-fixed parameters (i.e. that do not change substantially during the use of the service), such as an identifier (login), a password or a device type (deviceType) for example, and V1, ... , Vi are values associated with these parameters P1 to Pi;
  Pi+1, ... , Pn are a second set of parameters which vary during the use of the service, and Vi+1, ... , Vn are values associated with these parameters Pi+1 to Pn; a notification information item sent by the user agent UA to the web server WS falls within this category.

Depending on the length of these various parameters, this type of URL address cannot always be inserted into a notification message of limited size such as an SMS.

Also, according to a particular embodiment, when the notification message is generated according to the first protocol, the mobile terminal TE inserts into this message a (or several) compact access parameter(s), corresponding to one (or several) parameters of access to the WebApp application, in place of this (these) access parameter(s). Such a compact access parameter has a smaller size than the access parameter that it replaces, so as to reduce the space taken by this access parameter in the message.

When the intermediate equipment item NotifProxy receives such a notification message, it recovers the access parameter (or parameters) which has (have) been replaced from the compact access parameter (or parameters), for example by means of an association table in which the access parameters and their corresponding compact access parameters are stored, and inserts the duly recovered access parameter into the notification message according to the second protocol, intended to be received by the web server WS.

The correlation between the access parameters and their compact access parameters can be established by the intermediate equipment item NotifProxy itself, which generates compact access parameters from the access parameters received from the mobile terminal.

In such a case, the activation request message transmitted (step 131) in the activation phase of the management service can contain one or more parameter(s) of access to the WebApp application, this or these access parameter(s) being used by the intermediate equipment item NotifProxy to generate one or more compact access parameter(s), which are, on the one hand, stored in an association table, mapped with the access parameters which have been used to generate them, and, on the other hand, inserted into the activation acknowledgement message which is returned (step 133) to the mobile terminal TE.

As an example, the following access parameters can thus be transmitted in this activation request message:
  The base URL address, giving access to the service: BaseURL
  The uniqueness parameter of the service and the associated value P0=V0
  The fixed parameters and their associated values: P1=V1, ... , Pi=Vi
  The parameters Pi+1, ... , Pn, without their associated values Vi+1 to Vn After having received this activation request and extracted the above access parameters, the intermediate equipment item NotifProxy generates the following compact access parameters:
  A service identification parameter ServiceID and an associated Id value, representing both the BaseURL address and the service uniqueness parameter P0.
  Since this service identifier is linked to a specific user agent UA, it can have a reduced size compared to the sum of the sizes of the base URL address and of the uniqueness parameter. This size can, for example, be a single character.
  Values K1 to Kn, associated respectively with each of the access parameters P1 to Pn and having a reduced size compared to the values V1 to Vn initially associated with these parameters, for example a single character.

The intermediate equipment item NotifProxy then returns, in the activation acknowledgement message described previously, the following compact access parameters to the user agent UA:
  ServiceId=Id and P1=K1&...&Pn=Kn When, subsequently, the user agent UA creates a notification message intended for the WebApp application, these compact access parameters ServiceId=Id and P1=K1&...&Pn=Kn are inserted into this notification message, in place of the access parameters BaseURL and P0=V0&...&Pn=Vn.

This notification message, optimized in size, can then be transmitted to the intermediate equipment item NotifProxy (in the step 150), which can thus, from the ServiceId=Id and P1=K1&...&Pn=Kn parameters, recover the access parameters BaseURL, P0=V0 and P1=V1&...&Pn=Vn that it stored initially in the notification management service activation phase and construct an http request from these access parameters BaseURL, P0=V0 and P1=V1&...&Pn=Vn, as well as notification data transmitted in the notification message from the mobile terminal TE (step 160). This http request can then be transmitted over the Internet network to the web server WS, in order to be interpreted by the WebApp application installed on this web server, such that the management of the notifications in the uplink direction is modified transparently for the WebApp application and the web server WS.

In such an embodiment where some (even all) of the access parameters BaseURL, P0=V0 and P1=V1&...&Pn=Vn are stored in the intermediate equipment item NotifProxy, it proves useful to be able to update these parameters and values from the mobile terminal TE. To do this, a message type identification parameter can advantageously be inserted into the messages transmitted from the user agent to the intermediate equipment item. Such an identification parameter can take the form of a parameter designated "MessageTYPE" associated with one of the following three values:
  "0" to designate a message of termination of the notification management service in the uplink direction, aiming to terminate the process of conversion of the notification messages at the intermediate equipment item NotifProxy and thus switch back to a notification mode in which the notification messages, in the uplink direction, are transmitted directly to the web server WS according to the http protocol, without passing through the intermediate equipment item NotifProxy. This type of message is not intended to be retransmitted to the web server WS;

"1" to designate a notification message containing notification data emanating from the user agent UA and intended for the web server WS, as described previously;

"2" to designate an update message for one or more access parameters (BaseURL, P0 . . . Pn, V1 . . . Vn) stored in the intermediate equipment item NotifProxy. This type of message contains one or more new BaseURL, P0, . . . Pn access parameters and/or new values V1 to Vn which then replace the old access parameters, or the corresponding old values of these access parameters, in the association table stored by the intermediate equipment item NotifProxy. This type of message is also not intended to be retransmitted to the web server WS.

Thus, on reception of a notification message comprising the datum "MessageTYPE=0", the intermediate equipment item NotifProxy is informed that the mobile terminal TE wants to stop the uplink notification management service according to the present invention. The access data relating to the WebApp application can then be erased from the intermediate equipment item NotifProxy.

On reception of a notification message comprising the datum "MessageTYPE=2", the intermediate equipment item NotifProxy extracts the new access parameters and/or new values of these parameters transmitted in the message received, in order to subsequently use these new access information items on generating the notification message according to the second protocol, intended to be transmitted to the web server WS.

Figure 2A:
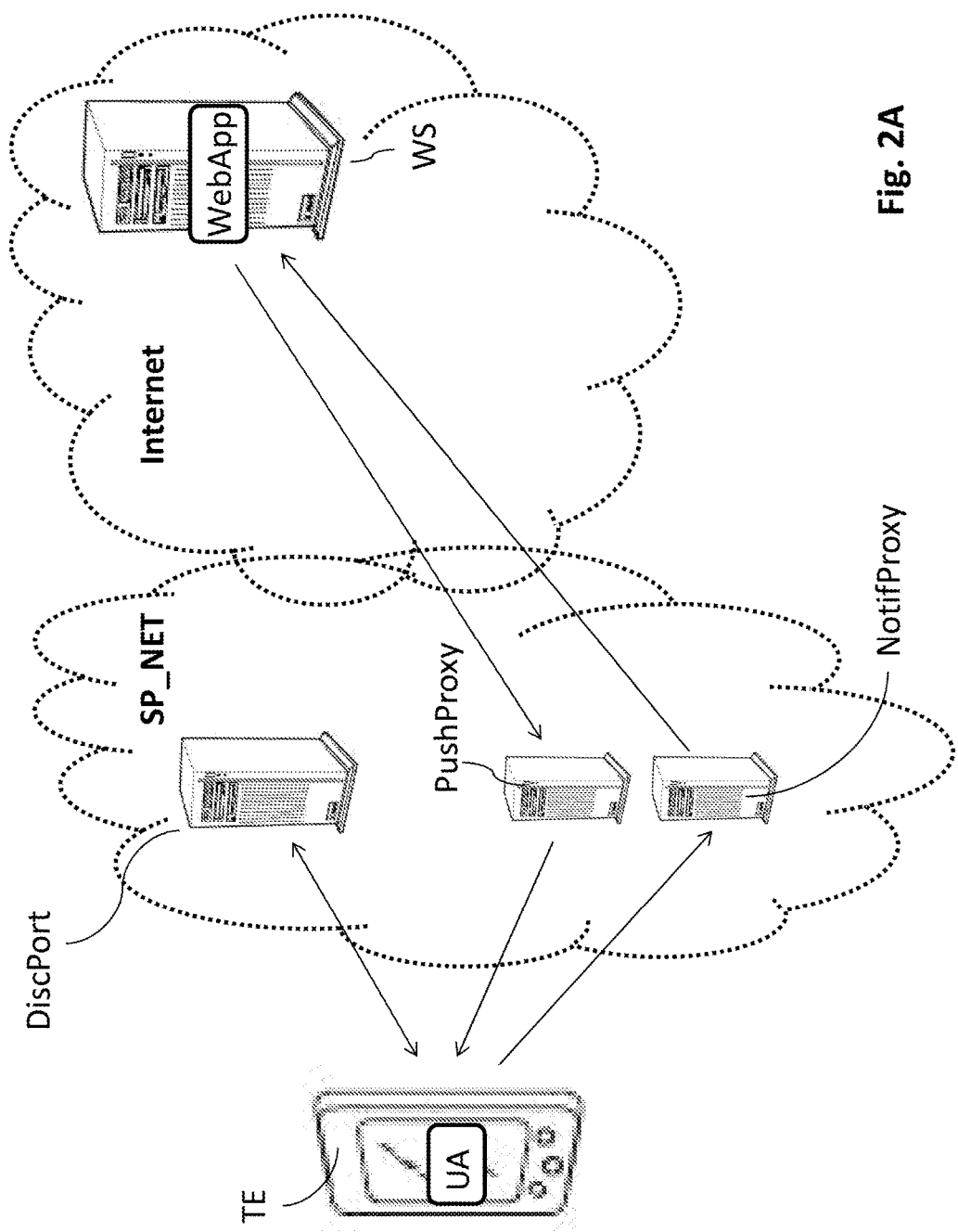
FIG. 2A schematically represents another telecommunications system in which a second embodiment of the notification management method according to the present invention can be implemented.

Reference is now made to FIG. 2A which illustrates a telecommunications system for implementing a notification management method according to another embodiment of the present invention.

This system is similar to the system illustrated previously in FIG. 2A, except that the telecommunications network further comprises a second intermediate equipment item, designated "PushProxy", used to retransmit the notification messages in the downlink direction, from the WebApp application installed on the web server WS to the user agent UA installed in the mobile terminal TE.

Such a PushProxy equipment item can take the form of a "proxy" server and notably comprises:
- a transceiver module suitable, on the one hand, for receiving notification requests according to the second protocol described previously (typically, http requests) transmitted by the web server WS and, on the other hand, for transmitting notification messages according to the first protocol described previously (for example in an SMS format) to the user agent UA; and
- a data processing module (for example a processor associated with a random access memory and a read only memory) used to analyze the notification requests received to deduce therefrom the notification messages to be transmitted to the user agent UA.

The intermediate equipment items NotifProxy and PushProxy are here illustrated as being distinct equipment items, without the invention being limited to this single case in point, the functionalities of these two equipment items being able to be combined in one and the same intermediate equipment item, which can be implemented in the form of a two-way proxy server, managing all the notifications between the user agent UA and the web server WS.

Figure 2B:
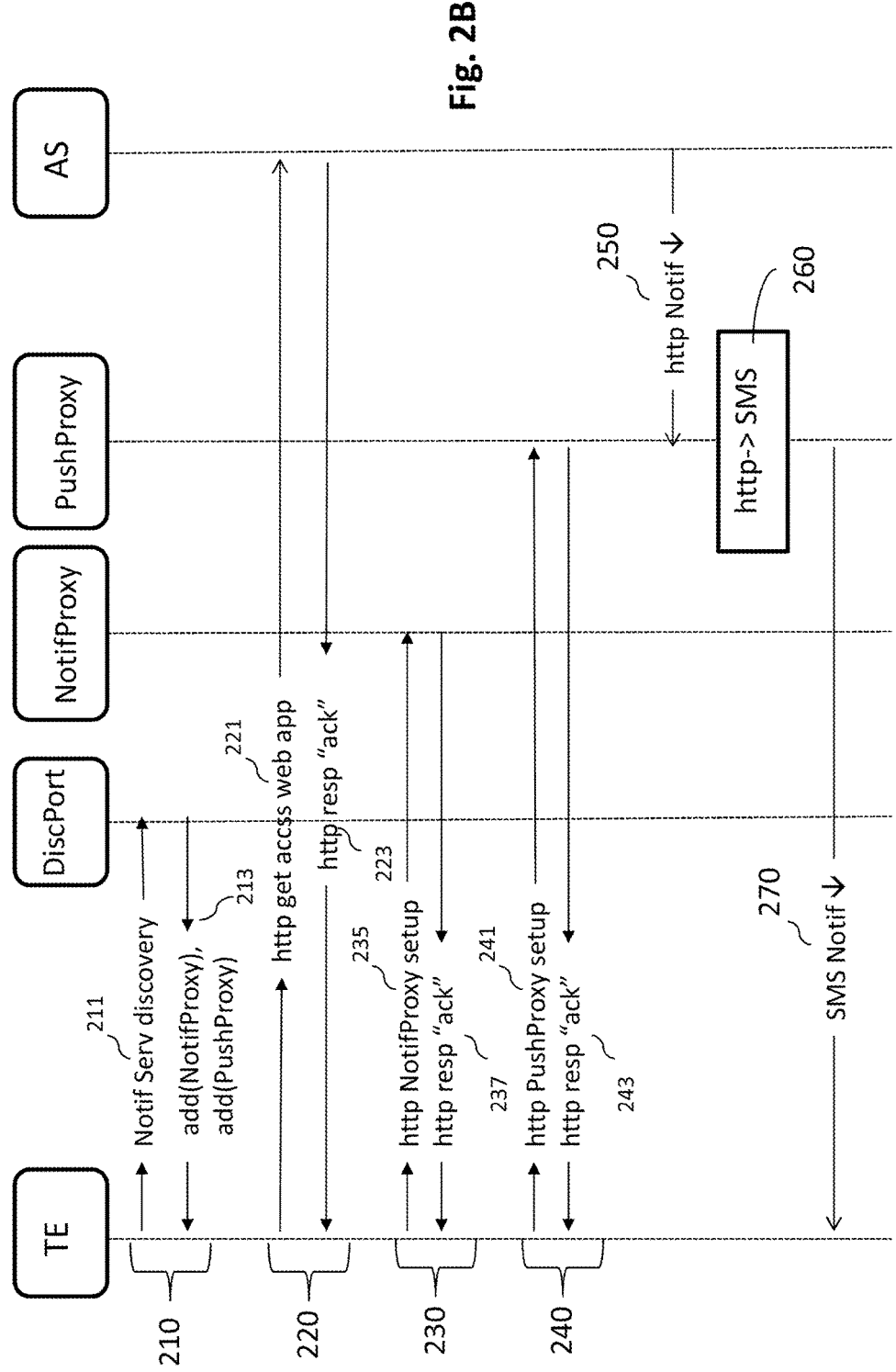
FIG. 2B illustrates the steps of a notification management method according to a second embodiment of the invention.

Reference is now made to FIG. 2B which illustrates a notification management method according to a second embodiment of the present invention.

This method begins advantageously with a phase (step 210) of discovery of the two intermediate equipment items NotifProxy and PushProxy, similar to the phase 110 previously described, except that the discovery portal DiscPort returns (step 213) to the mobile terminal TE not only the address add(NotifProxy) of the intermediate equipment item NotifProxy, but also the address add(PushProxy) of the intermediate equipment item PushProxy, in a response message following the reception (step 211) of a discovery request transmitted by the mobile terminal TE. Obviously, in the embodiment where the NotifProxy and PushProxy equipment items are implemented in the form of a single equipment item, a single address is returned to the mobile terminal TE.

The mobile terminal TE can then request access to the WebApp application installed in the web server WS (step 220), and trigger the action of the notification management service in the uplink direction to the intermediate equipment item NotifProxy (step 230), in a manner similar to the steps 120 and 130 described previously.

In order to activate also the established notification management service in the downlink direction, a phase of activation of such a service is further implemented (step 240) by the mobile terminal T, by exchanging data with the intermediate equipment item PushProxy in a manner similar to what is done in step 230.

Thus, an http request for activation of the management service in the downlink direction is transmitted (step 241) to the intermediate equipment item PushProxy by using the address add(PushProxy) recovered in the discovery phase 210. Following the reception of this http request, the intermediate equipment item PushProxy returns an acknowledgement message according to the http protocol to the mobile terminal TE (step 243), in order to confirm to the latter that the notification management service in the downlink direction is indeed activated and possibly transmit to it compact access parameters as described previously.

Once the notification management service is activated in both the uplink direction and the downlink direction, the notifications exchanged between the user agent UA and the WebApp application are done so via one of the two intermediate equipment items NotifProxy or PushProxy.

In the uplink direction, the notifications are transmitted in a manner similar to what has been described previously in relation to FIG. 1A.

In the downlink direction, a notification request according to the second protocol (typically http) transmitted (step 250) by the WebApp application to the user agent UA is received by the intermediate equipment item PushProxy, which then generates (step 260) a notification message conforming to a protocol (for example of SMS format) suited to transmission in a signaling channel and transmits (step 270) this notification message, in this signaling channel, to the mobile terminal TE where it can be interpreted by the user agent UA.

In one case in point, the signaling channel used for the notification messages is the same in the uplink direction and the downlink direction. In this case, the protocol used for the messages between the mobile terminal and the intermediate equipment item NotifProxy can be the same in these two directions.

In another case in point, the signaling channel used for the notification messages in the downlink direction can be different from the signaling channel used for the notification messages in the uplink direction (by way of nonlimiting example, when the notification messages are in SMS form, the "paging" signaling channel PCH can be employed in the downlink direction, whereas an SACCH or SCCCH signaling channel is employed in the uplink direction), in order to avoid a potential saturation of a signaling channel if the notifications multiply.

In the latter case, one and the same protocol (i.e. the SMS format) can be used, between the mobile terminal and the intermediate equipment item NotifProxy, for both transmission directions. Alternatively, it is also possible to use a first protocol suited to the signaling channel used for the notification messages in the uplink direction and a second protocol, different from the first, suited to the signaling channel used for the notification messages in the downlink direction.

Obviously, the invention is not limited to the exemplary embodiments described and represented above, from which other embodiments and forms will be able to be provided, without in any way departing from the context of the invention.

Furthermore, a single user agent UA has been illustrated in FIGS. 1A and 2A, but the invention obviously extends to any number of user agents, installed on one or more mobile terminals, exchanging notification data with a web application installed on a remote web server.

Furthermore, the notification messages exchanged between the mobile terminal and the intermediate equipment items NotifProxy and PushProxy have been illustrated as being in SMS form. However, the invention is not limited to this single type of message and can be applied to other forms of messages, such as messages of USSD (Universal Supplementary Service Data) type, which do not require the systematic establishment or re-establishment of a dedicated transmission channel for each notification to be exchanged between the mobile terminal TE and the web server WS.

Similarly, the notification messages exchanged between the web server and the intermediate equipment items NotifProxy and PushProxy have been illustrated as being messages constructed according to the http protocol. However, the invention is not limited to this single type of message and can be applied to any other data communication protocol over an Internet network, such as the WebSocket protocol for example, in as much as the use of such a protocol, suited to the transmission of data over an IP network, necessitates the systematic establishment or re-establishment of a dedicated transmission channel for each notification to be exchanged between the mobile terminal TE and the web server WS.

Although the present disclosure has been described with reference to one or more examples, workers skilled in the art will recognize that changes may be made in form and detail without departing from the scope of the disclosure and/or the appended claims.

The invention claimed is:

1. A method for managing notifications sent from a user agent installed in a mobile terminal to a web server, wherein the method comprises the following acts, performed by an intermediate equipment item:
   reception, from the mobile terminal, of a message conforming to a first communication protocol comprising at least one parameter of access to a service provided by the web server;
   generation of at least one compact access parameter from said at least one parameter of access;
   storing, in an association table, the at least one parameter of access and the corresponding compact access parameter;
   transmission, to the mobile terminal, of a message conforming to the first communication protocol comprising said generated compact access parameter;
   reception, from the mobile terminal, of a notification message conforming to a second protocol of type Short Message Service, said notification message comprising notification data emanating from the user agent, the notification data comprising at least said generated compact access parameter transmitted to the terminal;
   generation of a notification message conforming to the first communication protocol, in which the notification data are inserted, the notification data comprising the at least one parameter of access to an application installed in the web server;
      said access parameter being recovered from said association table according to said at least one compact access parameter received from the terminal in a message conforming to the second protocol;
      the size of the compact access parameter being less than the size of the parameter of access to the application; and
   transmission, to the web server, of the notification message according to the first protocol.

2. The method as claimed in claim 1, further comprising a phase of discovery during which the mobile terminal recovers the address of the intermediate equipment item from a discovery portal, said address being used by the mobile terminal in the transmission of the notification message and/or of the message comprising the parameter of access to the application.

3. The method as claimed in claim 1, in which the notification message conforming to the first protocol is an http request.

4. A method for sending notifications from a user agent installed in a mobile terminal to a web server, wherein the method comprises the following acts, performed by the mobile terminal:
   transmission, to an intermediate equipment item, of a message conforming to a first communication protocol comprising at least one parameter of access to an application installed in the web server; and
   reception, from the intermediate equipment item, of a message conforming to the first communication protocol comprising at least one compact access parameter, the compact parameter being associated in the intermediate equipment with said parameter of access to an application installed in the web server,
   generation of a notification message conforming to a second protocol of type Short Message Service, into which are inserted notification data emanating from the user agent, the notification data comprising the at least one compact parameter;
      said notification message enabling the intermediate equipment to recover the access parameter from the at least one compact access parameter inserted by the mobile terminal into the notification message according to the second protocol;
      the size of the compact access parameter being less than the size of the parameter of access to the application; and
   transmission of the notification message to the intermediate equipment item, which is configured to generate a notification message conforming to the first protocol, suited to transmission over the Internet network, into which the notification data are inserted with the parameter of access to the application, and for transmitting to the web server said notification message according to the first protocol.

5. An intermediate equipment item for managing the notifications sent from a user agent installed on a mobile terminal to a web server, wherein the intermediate equipment item comprises:

- a transceiver which receives, from the mobile terminal, a message conforming to a first communication protocol comprising at least one parameter of access to a service provided by the web server;
- a non-transitory computer-readable medium comprising instructions stored thereon; and
- a processor configured by the instructions to:
- generate at least one compact access parameter from said at least one parameter of access to the service supplied by the web server;
- store, in an association table, the at least one parameter of access and the corresponding compact access parameter; and
- said transceiver being further configured to receive, from the mobile terminal, a first notification message conforming to a second protocol of type Short Message Service, comprising notification data emanating from the user agent, the notification data comprising at least one compact parameter inserted by the terminal, the compact parameter being associated in the intermediate equipment with a parameter of access to an application installed in the web server, the size of the compact access parameter being less than the size of the parameter of access to the application;
- the processor being further configured by the instructions to:
- recover said access parameter from said association table according to said at least one compact access parameter;
- generate a first notification message conforming to the first protocol suited to transmission in the Internet network, into which the notification data including said access parameter recovered are inserted, and to transmit the first notification message with the transceiver according to the first protocol to the web server.

6. The intermediate equipment item as claimed in claim 5, in which:

- the transceiver is configured to receive, from the web server, a second notification message conforming to the first protocol suited to transmission in the Internet network, comprising notification data emanating from the web server;
- the processor is further configured by the instructions to generate a second notification message conforming to a second protocol of type Short Message Service, into which the notification data are inserted;
- the transceiver is further configured to transmit the second notification message conforming to the second protocol to the mobile terminal.

7. The intermediate equipment item as claimed in claim 6, in which the signaling channel used to receive the first notification message from the mobile terminal is different from the signaling channel used to transmit the second notification message to the mobile terminal.

8. A mobile terminal comprising:

- a non-transitory computer-readable medium comprising instructions stored thereon and in which is installed a user agent exchanging data with a web server;
- a transceiver configured to send to the intermediate equipment item at least one parameter of access to said web server and to receive, in return, at least one compact access parameter, the compact parameter being associated in the intermediate equipment with a parameter of access to an application installed in the web server, the parameter of access and the compact parameter being respectively sent and received according to a first communication protocol,
- a processor configured by the instructions to generate a notification message conforming to a second protocol of type Short Message Service, the notification message comprising notification data emanating from the user agent, the notification data comprising said at least one compact parameter received by the transceiver;
- said notification message enabling the intermediate equipment to recover the access parameter being from the at least one compact access parameter inserted by the mobile terminal into the notification message according to the second protocol;
- the size of the compact access parameter being less than the size of the parameter of access to the application; and
- the transceiver being further configured to transmit said notification message to the intermediate equipment item, which is configured to generate a notification message conforming to the first protocol suited to transmission over the Internet network, into which the notification data are inserted with the parameter of access to the application, and for transmitting to the web server said notification message conforming to the first protocol.

9. A non-transitory information medium, readable by a computer or a data processor, comprising instructions of a computer program stored thereon, which when executed by a computer or data processor of an intermediate equipment item configure the intermediate equipment item to implement a method for managing notifications sent from a user agent installed in a mobile terminal to a web server, wherein the instructions comprise:

- instructions that configure the intermediate equipment item to receive, from the mobile terminal, a message according to a first communication protocol comprising at least one parameter of access to a service provided by the web server;
- instructions that configure the intermediate equipment item to generate at least one compact access parameter from said at least one parameter of access;
- instructions that configure the intermediate equipment item to store, in an association table, the at least one parameter of access and the corresponding compact access parameter;
- instructions that configure the intermediate equipment item to transmit, to the mobile terminal, a message conforming to the first communication protocol comprising said generated compact access parameter,
- instructions that configure the intermediate equipment item to receive, from the mobile terminal, of a notification message conforming to a second protocol of type Short Message Service, said notification message comprising notification data emanating from the user agent, the notification data comprising at least one compact parameter inserted by the terminal, the compact parameter being associated in the intermediate equipment with a parameter of access to an application installed in the web server;
- instructions that configure the intermediate equipment item to generate a notification message conforming to the first protocol suited to transmission in the Internet network, in which the notification data are inserted, the notification data comprising the at least one parameter of access to an application installed in the web server, said access parameter being recovered said association table according to the at least one compact access received from the terminal in a message conforming to a second protocol of type Short Message Service;

the size of the compact access parameter being less than the size of the parameter of access to the application; and instructions that configure the intermediate equipment item to transmit, to the web server, the notification message according to the first protocol.

\* \* \* \* \*